(12) United States Patent
Choi

(10) Patent No.: US 7,227,683 B2
(45) Date of Patent: Jun. 5, 2007

(54) SPHERICAL REFLECTIVE SCREEN WITH FOCUS AND METHOD FOR MANUFACTURING THE SAME

(76) Inventor: Hae-Yong Choi, Mookdong I Park Apartment #108-301, 385 Mook-dong, Jungryang-gu, Seoul-city (KR) 131-768

( * ) Notice: Subject to any disclaimer, the term of this patent is extended or adjusted under 35 U.S.C. 154(b) by 123 days.

(21) Appl. No.: 10/526,963

(22) PCT Filed: Apr. 16, 2004

(86) PCT No.: PCT/KR2004/000876

§ 371 (c)(1),
(2), (4) Date: Mar. 7, 2005

(87) PCT Pub. No.: WO2004/092824

PCT Pub. Date: Oct. 28, 2004

(65) Prior Publication Data

US 2005/0243427 A1    Nov. 3, 2005

(30) Foreign Application Priority Data

Apr. 18, 2003   (KR) ...................... 10-2003-0024850

(51) Int. Cl.
    *G03B 21/56*   (2006.01)
(52) U.S. Cl. ...................................... 359/443; 359/451
(58) Field of Classification Search ................ 359/443, 359/449, 451
See application file for complete search history.

(56) References Cited

U.S. PATENT DOCUMENTS

| | | | | |
|---|---|---|---|---|
| 3,408,132 A | * | 10/1968 | Chandler et al. | ........... 359/451 |
| 3,653,740 A | * | 4/1972 | Ogura et al. | ................. 359/443 |
| 4,277,136 A | * | 7/1981 | Schudel | ....................... 359/451 |
| 4,500,163 A | * | 2/1985 | Burns et al. | ................... 359/15 |
| 7,057,812 B2 | * | 6/2006 | Sinkoff | ........................ 359/449 |
| 2002/0196538 A1 | | 12/2002 | Lantz et al. | ................. 359/443 |
| 2003/0038925 A1 | | 2/2003 | Choi | ........................... 353/79 |

FOREIGN PATENT DOCUMENTS

JP       54-63825     5/1979
KR       10-332289    3/2002

OTHER PUBLICATIONS

Abstract, JP5307212 published Nov. 19, 1993, Makino Kengo, downloaded from espacenet.com on Jun. 15, 2005.
Abstract, JP2002148711 published May 22, 2002, Shibano Nobuyuki et al., downloaded from espacenet.com on Jun. 15, 2005.

* cited by examiner

*Primary Examiner*—Christopher Mahoney
(74) *Attorney, Agent, or Firm*—Bacon & Thomas, PLLC

(57) ABSTRACT

Disclosed are a spherical reflective screen for displaying an image and a method for manufacturing the screen. The screen has a spherical surface with a radius of curvature of a circle drawn centering around a point, and a focal length of the screen is the same as a projection length of a projector so that the projector is located at a focal point of the screen, thus allowing the image formed by means of light projected from the projector to be straightly reflected on the screen but ambient light to be diffused to the outside. A frictional surface and diffusing lines are simultaneously formed on an aluminum foil by rubbing the double-layered aluminum foils together in one direction, therefore, viewing angle and resolution of the screen are improved two times or more.

2 Claims, 7 Drawing Sheets

(a)

(b)

(c)

SPHERICAL REFLECTIVE SCREEN WITH FOCUS AND METHOD FOR MANUFACTURING THE SAME

TECHNICAL FIELD

The present invention relates to a screen for displaying an image with a high luminance and a reflectivity of more than 10%, ten times as much as the reflectivity (i.e., 1%) of a conventional screen, and more particularly to a screen for displaying, which directs toward the viewers only light (image) projected from a projector disposed at a focal point of the screen and reflects off-axis light and defuses ambient light so that 10 times higher luminance is performed on the screen. The surface material of screen of the present invention consists of double-layered aluminum foil, on which friction face and diffusion lines are formed along the scanning lines. From rubbing the material's friction and diffusion face, the screen of the present invention gets 10~45% reflectivity so that it performs 10~45 times brighter and 2 times higher diffusion effect than the conventional screen. The screen of the present invention has improved as well 2 times or more in viewing angle and 10~20 times in resolution. Also, this invention relates to a method of manufacturing the screen.

BACKGROUND ART

As shown in FIG. 1, a conventional diffusion type plane diffusing screen 10 is configured such that light incident on the screen 10 is diffused in all directions. An image formed on the screen 10 is even, but has a reflectivity of 1% (generally, referred to as "1 gain"), thus being dark. Since the light incident on the screen 10 is diffused in all directions, the screen 10 acts on light from all directions. Accordingly, the screen 10 has a reduced resolution due to ambient light from all directions.

As shown in FIG. 2, a plane reflective screen 20 with an improved surface reflectivity is configured such that light projected from a projector is incident on the screen 20 at an incident angle ($\angle A$) and then reflected from the screen 20 at a reflection angle ($\angle B$) same as the incident angle ($\angle A$), thus allowing a viewer to watch an image formed on the screen 2 in the range of C obtained by the reverse angle of the reflection angle ($\angle B$).

That is, a hot spot is formed in the range of C. As shown in FIG. 2, the image displayed on the screen 2 is bright only at a central portion, but is dark at other peripheral portions, thus being invisible at the peripheral portions. In case that the surface reflectivity of the screen 2 is increased, the hot spot become brighter. On the other hand, in case that the surface reflectivity of the screen 2 is decreased, the hot spot will becomes darker and enlarger.

Further, in case that the surface reflectivity of the screen 2 is high, a screen having a non-spherical shape cannot display an image with even luminance, thus displaying uneven spots thereon. Further, since the screen having a non-spherical shape does not form an exact focus, this non-spherical screen cannot be used in a device requiring a high luminance.

However, all spherical screens cannot increase the luminance of screens. Only when a spherical screen comprises an optical element such as lens and a reflective surface, a screen can obtain an image with even luminance and high reflectivity over the whole surface of the screen.

Accordingly, there is required a method for forming an optical constitution and a surface reflectivity suitable for the structure of the screen.

Further, since the luminance of a screen is inversely proportional to the viewing angle of a screen, when a screen displays an image with a high luminance, the viewing angle of the screen is narrowed. The screen with the narrowed viewing angle cannot be effectively operated. Accordingly, there is required a spherical screen, which can display an image with a high luminance at a wider viewing angle.

DISCLOSURE OF THE INVENTION

Therefore, the present invention has been made in view of the above problems, and it is an object of the present invention to provide a spherical reflective screen, which displays an image having a even and high luminance with an improved reflectivity so that the viewing angle and resolution of the screen are improved more than two times, and a method for manufacturing the spherical reflective screen.

In accordance with one aspect of the present invention, the above and other objects can be accomplished by the provision of a spherical reflective screen for displaying an image, comprising:

a spherical surface with a radius of curvature of a circle drawn centering around a point, and including a frictional surface and diffusing lines formed on one side of an aluminum foil by rubbing the aluminum foil, wherein a projector is located at a focal point of the spherical surface so that the screen displays an image with a high luminance and an improved resolution at an improved viewing angle.

In accordance with another aspect of the present invention, there is provided a method for manufacturing a spherical reflective screen for displaying an image, wherein a frictional surface and diffusing lines are formed on aluminum foil by rubbing two aluminum foils together in a longitudinal or lateral direction, and the aluminum foil provided with the frictional surface and the diffusing lines is bent so that the aluminum foil provided with the frictional surface and the diffusing lines has a designated radius of curvature and serves as the spherical surface of the screen.

BRIEF DESCRIPTION OF THE DRAWINGS

The above and other objects, features and other advantages of the present invention will be more clearly understood from the following detailed description taken in conjunction with the accompanying drawings, in which:

FIG. 3a is a schematic view of the spherical mirror onto which light at a position outside the range of a focus is projected;

FIG. 3b is a schematic view of the spherical mirror onto which light in the range of the focus is projected; and FIG. 3c is a schematic view of the spherical mirror onto which light at a position inside the range of the focus is projected;

BEST MODE FOR CARRYING OUT THE INVENTION

Now, preferred embodiments of the present invention will be described in detail with reference to the annexed drawings.

Figure 4:
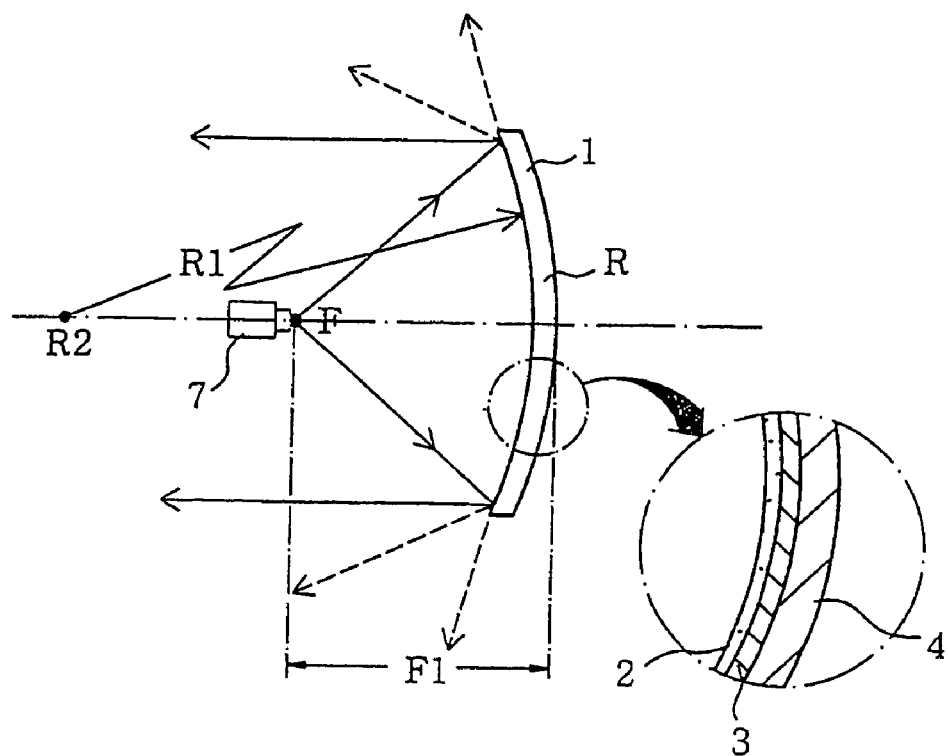
FIG. 4 is a schematic view of a reflective screen in accordance with the present invention.
Figure 5:
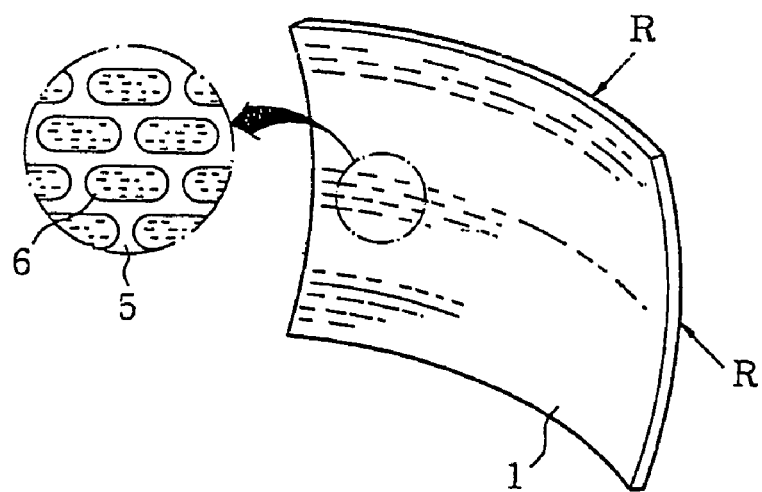
FIG. 5 is a schematic view illustrating diffusing lines of the reflective screen in accordance with the present invention.

As shown in FIGS. 4 and 5, a spherical screen 1 of the present invention comprises a reflective surface having a spherical shape (R) with a radius of curvature (R1) of a circle drawn centering around a point (R2).

The reflective surface of the screen 1 has a reflectivity of 10% at the minimum to 45% at the maximum, and preferably 10% to 30%. However, the reflective surface of the screen 1 is not limited thereto.

In case that the reflectivity of the reflective surface of the screen 1 is less than 10%, the screen 1 cannot obtain a desirably high luminance. On the other hand, in case that the reflectivity of the reflective surface of the screen 1 is more than 45%, it is difficult to perform the following procedure for forming diffusing lines 6 and a frictional surface 5 on an aluminum foil. That is, the reflectivity of the reflective surface of the screen is limited in the range of 10% to 45%. Here, the reflectivity of 10% to 45% means that a screen luminance index is 10 to 45 gain.

A focal point (F) is formed at a central point of the radius of curvature from the point (R2) to the reflective surface of the spherical screen 1. A distance from the focal point (F) to the reflective surface of the spherical screen 1 is referred to as a focal length.

A projector 7 is located at the focal point (F).

A projection length (F1) of the projector 7 is the same as the focal length of the screen 1.

Figure 1:
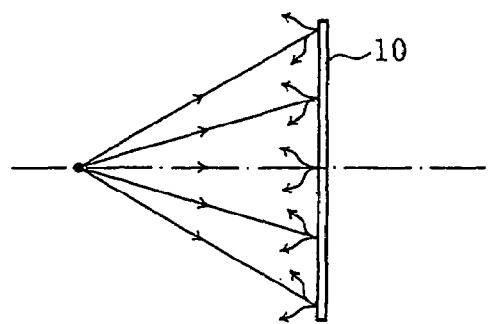
FIG. 1 is a schematic view of conventional plane diffusion screen.
Figure 2:
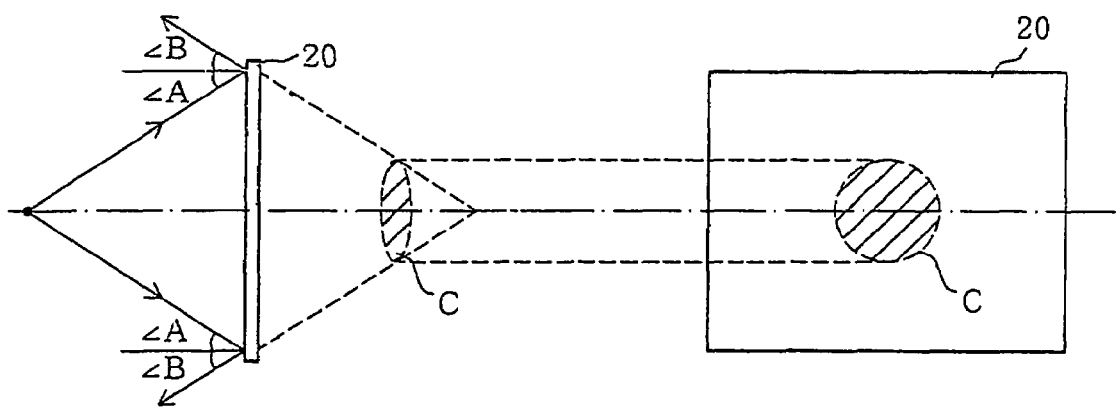
FIG. 2 is a schematic view illustrating a hot-spot phenomenon occurring on a plane reflective screen.
Figure 3:
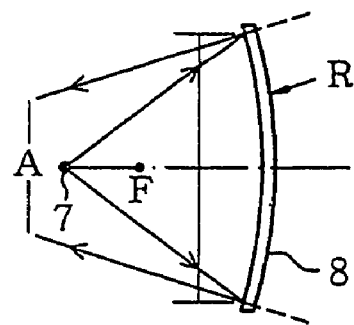
FIGS. 3a to 3c are schematic views of a spherical mirror, and more specifically.
Figure 3:
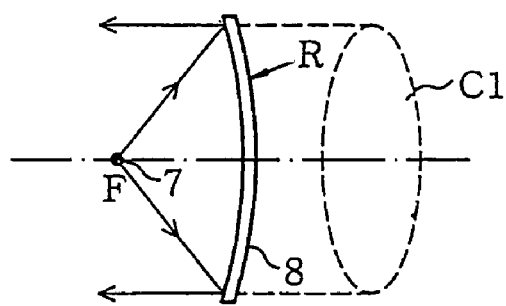
Figure 3:
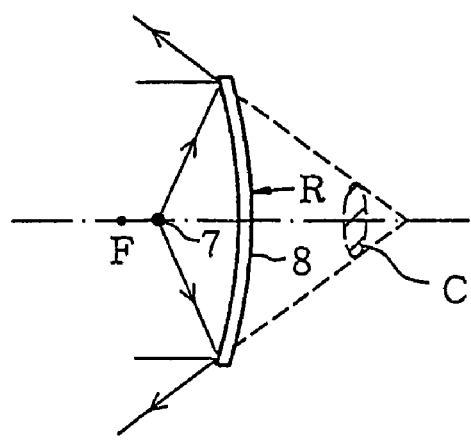

As shown in FIG. 3b, light from the projector 7 located at the focal point (F), which is incident on the spherical surface (R), is straightly reflected on the spherical surface (R). Then, a viewer can watch a formed image in the range of C1 obtained by the inverse angle of the reflection angle.

As shown in FIG. 3c, light from the projector 7 located in the front of the focal point (F), which is incident on the spherical surface (R), is reflected on the spherical surface (R) at an increased angle, thus causing a hot spot phenomenon.

As shown in FIG. 3a, light from the projector 7 located in the rear of the focal point (F), which is incident on the spherical surface (R), is reflected toward the focal point (F), thus causing the visual angle (A) to be narrowed.

The above-described cases relate to a spherical mirror with a reflectivity of 100%. The screen of the present invention has a designated reflectivity and diffusing coefficient. In order to obtain optimized effects of improved viewing angle and resolution, since the hot spot is generated in proportion to the diffusing coefficient, the focal length from the focal point (F) to the reflective surface of the screen must be the same as the projection length (F1).

Figure 6:
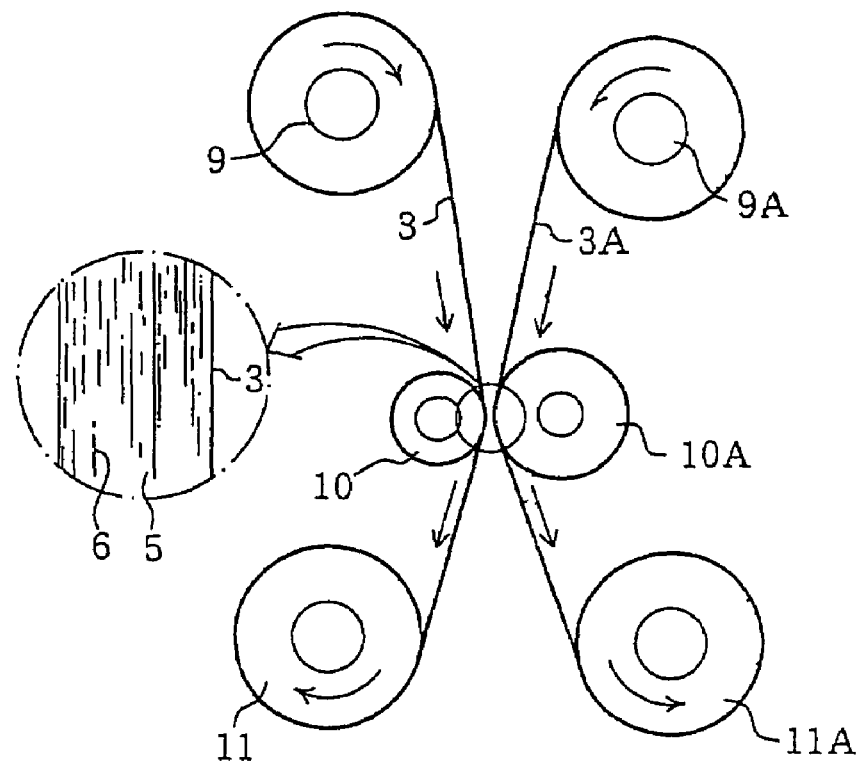
FIG. 6 is a schematic view illustrating a process for forming a diffusing lines and a frictional surface on the reflective screen in accordance with the present invention.

As shown in FIGS. 4 and 6, the reflective surface of the spherical screen 1 includes a frictional surface 5 with a designated reflectivity and a plurality of diffusing lines 6 arranged in a lateral direction formed by rubbing two aluminum foils 3 together. The diffusing lines 6 serve as diffusing surfaces. Then, a protective surface 2 is formed on the inner sides of the frictional surface 5 and the diffusing lines 6, and a supporting plate 4 made of plastic is attached to outer sides of the frictional surface 5 and the diffusing lines 6.

Here, the protective surface 2 is formed by coating silicon or acrylic resin on the inner side of the frictional surface 5 and diffusing lines 6. Silicon or acrylic resin is not an obstacle to the light projection of the projector 7.

The protective surface 2 of FIG. 6 may be formed by attaching a thin sheet made of polytetrafluoroethylene (PTFE) sold under the trademark Teflon to the outer sides of the frictional surface 5 and the diffusing lines 6.

Teflon is not easily contaminated by external dust, has a high hardness and a high resistivity to foreign substances, thus forming a solid screen surface. Further, fine laterally curved lines are formed on the screen surface in a longitudinal direction and then laterally overlapped, thus remarkably increasing the visual angle of the screen.

The screen of the present invention is characterized in that the diffusing lines 6 are formed on the screen so as to obtain the desired viewing angle of the screen and the frictional surface 5 is formed on the screen so as to obtain the desired reflectivity.

Hereinafter, a method for manufacturing the above-described surface of the aluminum foil 3 provided with the diffusing lines 6 and the frictional surface 5 will be described in detail.

That is, the diffusing lines 6 and the frictional surface 5 are formed on the aluminum foils 3 and 3A by rubbing left and right aluminum foils 3 and 3A against each other and by transferring the left and right aluminum foils 3 and 3A between left and right upper rollers 9 and 9A and between left and right lower rollers 11 and 11A in rolling the aluminum foils 3 and 3A. Here, the diffusing lines 6 are formed on the aluminum foils 3 and 3A in the direction of the applied friction so that the frictional surface 5 can have a reflectivity of 10% to 45% by adjusting pressure applied by left and right pressure rollers 10 and 10A.

Figure 10:
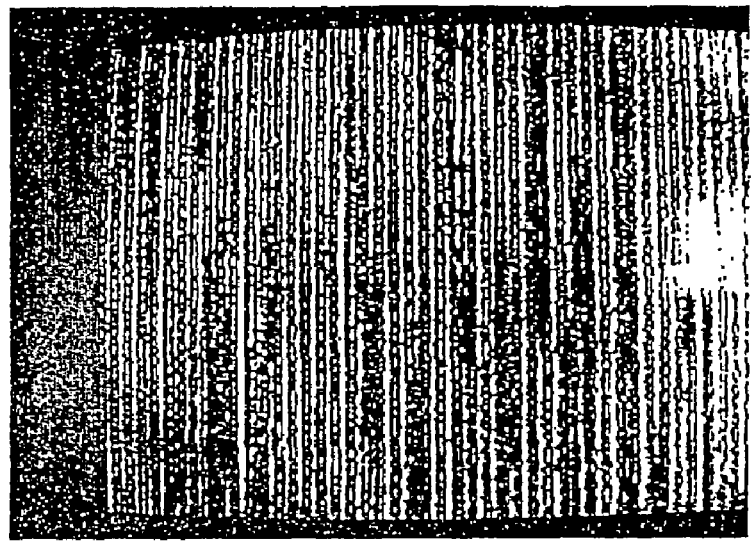
FIG. 10 is an enlarged photograph of an aluminum foil obtained by the present invention, as seen through a microscope.

That is, the frictional surface 5 with a reflectivity of 10% to 45% shown in FIG. 10 is obtained by adjusting the pressure applied by the left and right pressure rollers 10 and 10A.

In case that the reflectivity of the frictional surface 5 is less than 10%, the screen cannot have high luminance efficiency. On the other hand, in case that the reflectivity of the frictional surface 5 is more than 45%, the depths of the scattering lines 6 and the frictional surface 5 are reduced in the above rubbing procedure.

FIG. 10 is a photograph of the frictional surface 5 with a reflectivity of 25% obtained by rubbing the aluminum foil 3 with a thickness of 20~100 micron, preferably 50 micron by the above-described procedure, which is enlarged hundred times using a monitor microscope. Here, the diffusing lines 6 with a thickness of 10 micron are overlapped, thus allowing the screen provided with the frictional surface 5 and the diffusing lines 6 to have a viewing angle of 60°.

Figure 11:
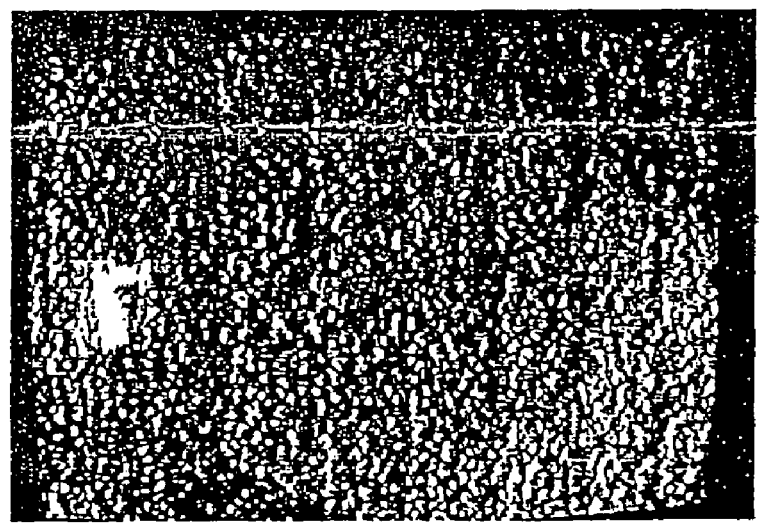
FIG. 11 is an enlarged photograph of a conventional aluminum foil, as seen through a microscope.

FIG. 11 is a photograph of the aluminum foil 3 obtained by a conventional rolling procedure without the use of the above rubbing procedure. Here, the aluminum foil 3 does not have scattering lines.

Such an aluminum foil 3 obtained by the conventional rolling procedure has a reflectivity 25% as same as that of the frictional surface, but has a viewing angle of less than of 30°. Accordingly, it is difficult to practically use the aluminum foil 3 without diffusing lines as a material of the screen 2.

For reference, light was projected onto the reflection surface of the screen of the present invention using a projector made by SANYO in Japan (Model No. plc-xp 41k), and the luminance of the screen was measured by a luminance measuring apparatus made by MINOLTA in Japan (Model No. LS-110).

Hereinafter, a method for manufacturing the aluminum foil provided with the above-described diffusing lines 6 and frictional surface 5 will be described in detail.

Figure 7:
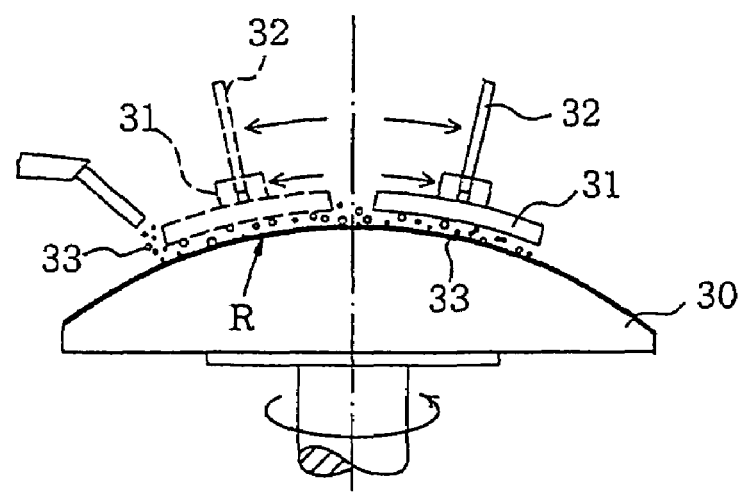
FIG. 7 is a schematic view illustrating a method for manufacturing a spherical frame.

As shown in FIG. 7, an abrasive compound 33 is supplied onto one surface of a member having a desired radius of curvature (R) required by the spherical screen 1, and then the surface of the member is polished using a rotating abrasive plate 31 with the radius of curvature (R). Thereby, a spherical frame 33 with the radius of curvature (R) is obtained.

Figure 8:
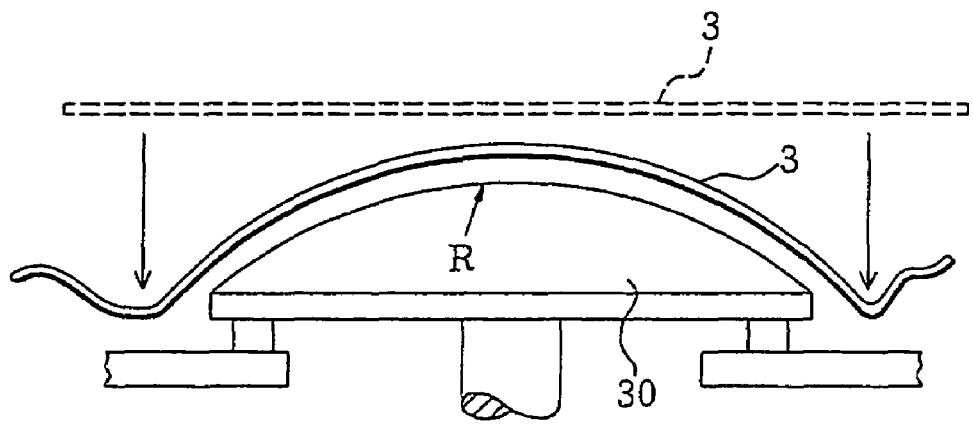
FIG. 8 is a schematic view illustrating a step of forming the spherical shape of an aluminum foil during a process for manufacturing the reflective screen in accordance with the present invention.

As shown in FIG. 8, one surface of the aluminum foil 3 is pressed onto such a spherical frame 33, thus allowing the aluminum foil 3 to have the radius of curvature (R).

Figure 9:
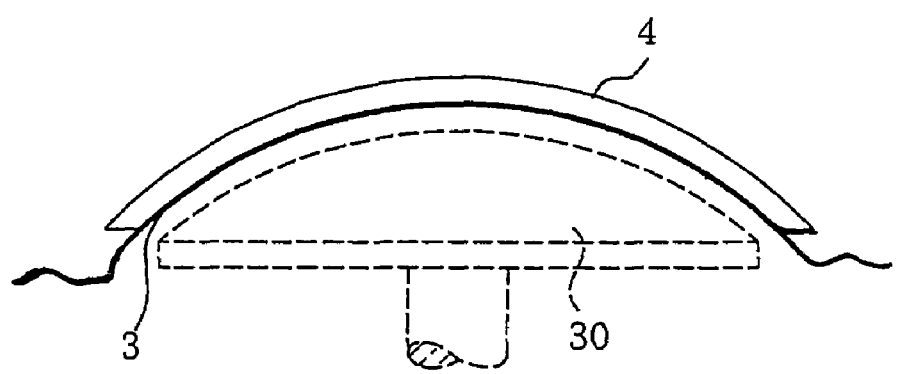
FIG. 9 is a schematic view illustrating a method for manufacturing the reflective screen in accordance with the present invention.

As shown in FIG. 9, the support plate 4 made of plastic is attached to the other surface of the aluminum foil 38 with the radius of curvature (R). Thereby, the spherical screen 1 is completely manufactured.

As shown in FIG. 4, the spherical surface (R) of the screen 1 has the radius of curvature (R1) of a circle drawn centering around the point (R2), thus allowing the screen 1 to have proper optical characteristics and reflectivity and locating the focal point (F) at a proper position.

The relation between the focal length (F') and the length (R') of the radius of curvature of the spherical surface (R) is represented by an equation of F'=32 R'/2.

Further, the relation between the projection length (F1) of the projector 7 and the focal length (F') is represented by an equation of F1=F'.

More specifically, for example, in case that the screen 1 has the size of 100", the projection length (F1) of the projector 7 is generally 4.5 m.

In this case, since the relation between the projection length (F1) of the projector 7 and the focal length (F') is represented by the above equation of F1=F', the projector 7 is separated from the screen 1 by the distance of 4.5 m. Then, since the relation between the focal length (F') and the length (R') of the radius of curvature of the spherical surface (R) is represented by the above equation of F'=R'/2, i.e., R'=2F', the length (R') of the radius of curvature of the spherical surface (R) is 9 m.

Since the diffusing lines 6 shown in FIG. 6 are laterally formed on the frictional surface 5, the lateral diffusing rate of light on the screen 1 is two times as high as the longitudinal diffusing rate of light on the screen 1.

Accordingly, compared to the conventional screen, it is possible to increase the viewing angle of the screen 1 two times or more as broad as the longitudinal viewing angle of the screen 1.

The above light diffusing removes the occurrence of a hot spot due to the straight reflection shown in FIG. 4, thus allowing the screen 1 to display an image with a uniform luminance and increasing the viewing angle of the screen 1. The viewing angle is an essential factor required in the screen 1.

The spherical screen 1 of the present invention is configured so that the screen 1 receives light projected only from the projector 7 located at the focal point (F), and then displays an image using the received light via the whole surface of the screen 1, but diffuses other external interfering light to the outside. Accordingly, the image displayed on the screen 1 is not influenced by external interfering light even in a bright space. Further, as a result of a test using a contrast pattern represented by the diffusing lines 6, the resolution of the image displayed by the screen 1 of the present invention is improved to two times as much as that of the conventional screen.

Figure 12:
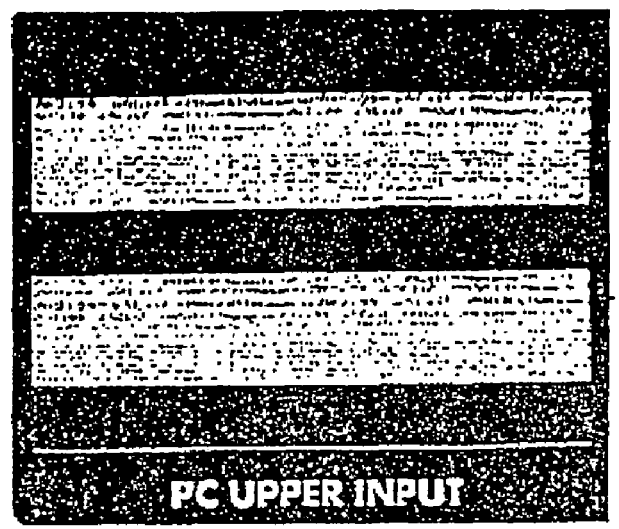
FIG. 12 is a photograph illustrating the resolution of a spherical screen with diffusing lines formed thereon.
Figure 13:
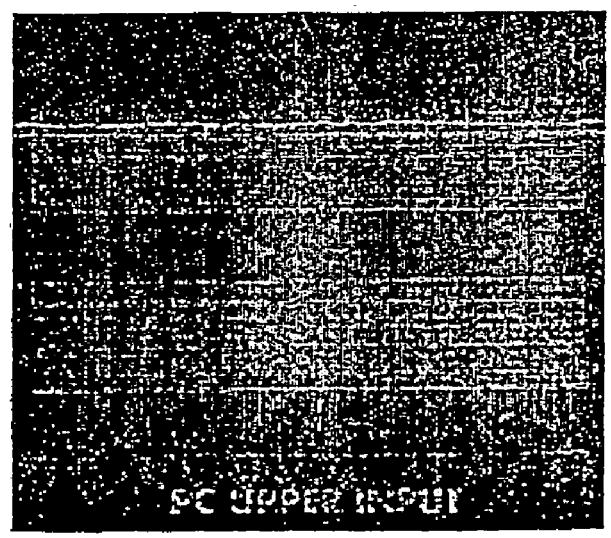
FIG. 13 is a photograph illustrating the resolution of a spherical screen without diffusing lines.

For example, as shown in FIG. 12, the spherical screen 1 provided with the diffusing lines 6 has a high resolution so that even a letter in the size of a 4-point in an image displayed on the screen 1 is distinguishable. On the other hand, as shown in FIG. 13, the conventional spherical screen without diffusing lines has a relatively low resolution so that a letter to the size of a 10-point in an image displayed on the screen is distinguishable.

Accordingly, the resolution of the spherical screen 1 of the present invention provided with the diffusing lines 6 is improved more than two times as much as that of the conventional screen.

INDUSTRIAL APPLICABILITY

As apparent from the above description, the present invention provides a spherical reflective screen, which displays an image having a high luminance with a reflectivity of 10% to 45% and forms an image by means of only light projected from the projector located at the focal point of the spherical surface of the screen, thus enlarging the viewing angle of the screen more than two times via the fine diffusing lines laterally formed on the screen and improving the resolution more than two times via the contrast pattern represented by the diffusing lines.

Further, the present invention provides a method for manufacturing a spherical reflective screen with improved viewing angle and resolution, which displays an image with a high luminance by forming a frictional surface and diffusing lines on an aluminum foil obtained by rubbing two aluminum foils together, so that the luminance obtained due to the reflectivity of the surface of the screen, and the lateral viewing angle and the resolution of the screen obtained due to the diffusing lines are improved, and by bending the aluminum foil provided with the frictional surface and the diffusing lines so that the aluminum foil provided with the frictional surface and the diffusing lines has a designated radius of curvature and serves as the spherical surface of the screen.

The screen of the present invention may be widely and effectively used as an educational screen for providing a clear image with a high resolution in a bright classroom, a conference screen for providing a clear image in a bright office room without the use of a curtain, and an advertising screen in a bright public place.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing a spherical reflective screen having a focal point and a spherical surface for displaying an image, comprising:

preparing an aluminum foil as a surface material of the screen;

rubbing one surface of the aluminum foil in a lateral direction corresponding to a scanning direction of the screen, to form a frictional surface and coherent lateral diffusing lines on the surface of the aluminum foil; and shaping the aluminum foil to have a regular spherical shape such that the focal point is formed at a position spaced from a center of curvature of the screen by a distance corresponding to one half of the length of a radius of curvature of the screen.

2. A method for manufacturing a spherical reflective screen for displaying an image as set forth in claim 1, wherein the spherical surface of the screen includes a protective surface made of silicon, acrylic resin or a thin polytetrafluoroethylene sheet attached to the surface of the aluminum foil.

* * * * *